United States Patent [19]

Ohta et al.

[11] Patent Number: 5,218,581
[45] Date of Patent: Jun. 8, 1993

[54] MAGNETO-OPTICAL RECORDING MEDIUM AND METHOD FOR REPRODUCING SIGNAL USING AN EXTERNAL MAGNETIC FIELD FROM SUCH A MEDIUM

[75] Inventors: Masumi Ohta, Tokyo; Katsuhisa Aratani, Chiba, both of Japan

[73] Assignee: Sony Corporation, Tokyo, Japan

[21] Appl. No.: 815,332

[22] Filed: Dec. 27, 1991

[30] Foreign Application Priority Data

Dec. 27, 1990 [JP] Japan .................................. 2-415025

[51] Int. Cl.⁵ ...................... G11B 13/04; G11B 11/12; G11B 11/10
[52] U.S. Cl. ......................................... 369/13; 360/59; 360/114
[58] Field of Search ..................... 369/13; 360/114, 60, 360/59, 66; 365/122; 428/694

[56] References Cited

U.S. PATENT DOCUMENTS 5,018,119 5/1991 Aratani et al. ..................... 360/114
5,094,925 3/1992 Ise et al. ............................ 369/13

FOREIGN PATENT DOCUMENTS 2-96926 5/1989 Japan .

Primary Examiner—Hoa T. Nguyen

[57] ABSTRACT

The present invention is intended to improve the track recording density and track density of a magneto-optic recording medium to prevent the deterioration of characteristics due to the variation of reproducing power. After recording information signals on a magneto-optic recording medium having at least a reproducing layer, an intermediate layer and a record hold layer, the direction of magnetization of the reproducing layer is turned in the direction of a initializing magnetic field. The reproducing layer is irradiated with a laser beam and a reproducing magnetic field is applied to the same simultaneously to heat the reproducing layer in a temperature distribution so that a region remaining in an initialized state, a region to which information signals are transferred and a region magnetized in the direction of the reproducing magnetic field are formed. Magnetic signals are read from the region of the reproducing layer to which information signals have been transferred.

10 Claims, 5 Drawing Sheets

MAGNETO-OPTICAL RECORDING MEDIUM AND METHOD FOR REPRODUCING SIGNAL USING AN EXTERNAL MAGNETIC FIELD FROM SUCH A MEDIUM

BACKGROUND OF THE INVENTION

1. Field of the Invention

This invention relates to a magneto-optical recording medium wherein information bits (magnetic domains) are read out by the magneto-optical effect and more particularly, to a magneto-optical recording medium wherein information bits are partially distinguished or expanded depending on the temperature distribution in a reproduction beam spot at the time of reproduction. The invention also relates to reproduction methods using the medium mentioned above.

2. Description of the Prior Art

The magneto-optical recording system makes use of the fundamental principle that a magnetic thin film is partially heated to a temperature which exceeds the Curie point or compensation temperature so that the coercive force of the heated portion is lost and the direction of magnetization is inverted to conform to the direction of a recording magnetic field which is applied from outside. A known magneto-optical recording medium has such an arrangement which includes a transparent substrate such as of, for example, polycarbonate and a recording portion formed on one side of the substrate. The recording portion includes a built-up layer structure which has a magnetic recording layer, which has an axis of easy magnetization in a direction vertical to the film plane and good magneto-optical characteristics and is made, for example of a rare earth element-transition metal amorphous alloy, a reflection layer, and a dielectric film. Signals are read out by irradiation of a laser beam from the side of the transparent substrate.

Not only in the magneto-optical recording medium, but also in digital audio disks (so-called compact disks) or optical disks such as video disks, the linear recording density is determined by the S/N value at the time of reproduction. The quantity of reproduction signals depends greatly on the pitch or frequency of recorded signal bit rows and the laser beam wavelength and the numerical aperture of an objective lens of a reproducing optical system.

At present, when the laser beam wavelength, $\lambda$, and the numerical aperture, N.A. are determined, the bit frequency, f, which becomes a detection limit is determined as follows: $f = \lambda/2$ N.A.

Accordingly, in order to make high density recording of optical disks, it is fundamentally essential to shorten the laser beam wavelength $\lambda$, and increase the numerical aperture, N.A. of the objective lens.

However, existing techniques place limitations on the improvements in the laser beam wavelength $\lambda$, and the numerical aperture N.A. of the objective lens. Another approach to improve the recording density has been made wherein efforts have been made in the construction of the magneto-optical recording medium and the manner of reading out from the medium.

For instance, the present applicant proposed in Japanese Laid-open Patent Application Nos. 1-143041 and 1-143042, incorporated herein, systems wherein an information bit (magnetic domain) is partly expanded, shrunk or extinguished, thereby improving reproducing resolution. In the system, the magnetic recording layer is made of an exchange-interacted multi-layered film which includes a reproduction layer, an intermediate layer and a record-holding layer. At the time of reproduction, a magnetic domain of the reproduction layer which has been heated by means of a reproducing light beam is expanded or shrunk or extinguished at the high temperature portion, making it possible to reproduce a signal with a pitch which exceeds a diffraction limit.

In the procedure wherein information bits are partially expanded, shrunk or extinguished at the time of reproduction, record information with a density higher than a record density which is determined depending on the laser beam wavelength $\lambda$, and the numerical aperture N.A., can be reproduced. We made further investigations and, as a result, found that mere selection of the Curie point and the coercive force does not always lead to reproduction with a high C/N (Carrier-to-Noise) value.

SUMMARY OF THE INVENTION

It is an object of the invention to provide a optical recording medium wherein high density recording bits, which exceed a recording density determined by the laser beam wavelength $\lambda$, and the numerical aperture N.A., of an objective lens, can be reproduced with a high C/N value.

It is another object of the invention to provide a method for reproducing a signal of a recorded magnetic domain from the medium of the type mentioned above whereby the size of the magnetic domain can be expanded, shrunk or extinguished.

The present inventors made intensive studies over a long term in order to attain the above objects. As a result, it was found that in the above-stated recording system, the types of magnetic materials used a the first and third magnetic films and the saturation magnetizations of these films greatly influence the C/N value.

According to one embodiment of the invention, there is provided a magneto-optical recording medium which has, on a transparent substrate, a magneto-optical recording layer consisting of a first magnetic film, a second magnetic film and a third magnetic film which are magnetically coupled to one another at room temperature $T_{RT}$, wherein the Curie points $T_{c1}$, $T_{c2}$ and $T_{c3}$ of the first, second and third magnetic films, respectively, have the relationships of 60° C. $\leq T_{c2} \leq$ 200° C. $T_{c2} < T_{c1}$ and $T_{c2} < T_{c3}$. The coercive force $H_{c1}$ of the first magnetic film is selected so as to be small in the vicinity of the Curie point $T_{C2}$ of the second magnetic film. The coercive force $H_{c3}$ of the third magnetic film is selected so as to be larger than a required minimum magnetic field intensity within a temperature range between said room temperature $T_{RT}$ and a predetermined temperature $T_{PB}$ which is higher than the Curie point $T_{c2}$ of the second magnetic film. The first magnetic film is mainly composed of GdFeCo and the saturation magnetization $M_{S1}$ of the first magnetic film is not greater than 200 emu/cc when the sublattice of the transition metals is more predominant than that of the rare earth element or when the sublattice of the rare earth element is more predominant than the sublattice of the transition metals. The third magnetic film is mainly composed of TbFeCo and the saturation magnetization $M_{S3}$ of the third magnetic film is not greater than 300 emu/cc when the sublattice of the transition metals is more predominant than the sublattice of the rare earth element, or not greater than 160 emu/cc when the sublattice of the rare earth element is more predominant than the sublattice of the transition metals.

According to another embodiment of the invention, there is also provided a method for reproducing a signal of a recorded magnetic domain from a magneto-optical recording medium having a first magnetic film, a second magnetic film, and a third magnetic film which are magnetically coupled to one another at room temperature $T_{RT}$. The Curie points $T_{c1}$, $T_{c2}$, and $T_{c3}$ of the first, second, and third magnetic films, respectively, have the relationships of $T_{c2} > T_{RT}$, $T_{c2} < T_{c3}$. The coercive force $H_{c1}$ of the first magnetic film is selected so as to be small in the vicinity of the Curie point $T_{c2}$ of the second magnetic film. The coercive force $H_{c3}$ of the third magnetic film is selected so as to be larger than a required minimum magnetic field intensity within a temperature range between said room temperature $T_{RT}$ and a predetermined temperature $T_{PB}$ which is higher than the Curie point $T_{c2}$ of the second magnetic film. The first magnetic film is mainly composed of GdFeCo and the saturation magnetization $M_{S1}$ of the first magnetic film is not greater than 200 emu/cc when the sublattice of the transition metals is more predominant than that of the rare earth element, or when the sublattice of the rare earth element is more predominant than the sublattice of the transition metals. The third magnetic film is mainly composed of TbFeCo and the saturation magnetization $M_{S3}$ of the third magnetic film is not greater than 300 emu/cc when the sublattice of the transition metals is more predominant than the sublattice of the rare earth element or not greater than 160 emu/cc when the sublattice of the rare earth element is more predominant than the sublattice of the transition metals. Upon the reproduction of the signal from the magneto-optical recording medium, the medium is heated to the predetermined temperature $T_{PB}$ to interrupt the magnetic coupling between the first and third magnetic films by application of a magnetic field for demagnetizing magnetic fields o stray magnetic fields from the recording medium. The external magnetic field is sufficient to provide the required magnetic intensity to change a domain size in the first magnetic film.

Alternatively, during a time when the signal from the magneto-optical recording medium is present, the medium is heated to the predetermined temperature $T_{PB}$ with the application of a magnetic field for demagnetizing magnetic fields or stray magnetic fields from the recording medium. The external magnetic field which is provided is sufficient to provide the required magnetic intensity to the first magnetic film so as to cause shrinking or expansion of the recorded magnetic domain.

In these methods, the signal is obtained by detecting a signal change upon change of the domain size.

According to a further embodiment of the invention, there is also provided a method for reproducing a signal of a recorded magnetic domain from a magneto-optical recording medium having a first magnetic film, a second magnetic film and a third magnetic film magnetically coupled to each other at room temperature $T_{RT}$. The Curie points $T_{c1}$, $T_{c2}$, and $T_{c3}$ of the first, second, and third magnetic films, respectively, have the relationships of 60° C. $< T_{c2} \leq 200°$ C., $T_{c2} < T_{c1}$, and $T_{c2} < T_{c3}$. The first magnetic film is mainly composed of GdFeCo and the saturation magnetization $Mp_{S1}$ of the first magnetic film is not greater than 200 emu/cc when the sublattice of the transition metals is more predominant than that of the rare earth element, or when the sublattice of the rare earth element is more predominant than the sublattice of the transition metals. The third magnetic film is mainly composed of TbFeCo and the saturation magnetization $M_{S3}$ of the third magnetic film is not greater than 300 emu/cc when the sublattice of the transition metals is more predominant than the sublattice of the rare earth element or not greater than 160 emu/cc when the sublattice of the rare earth element is more predominant than the sublattice of the transition metals. The medium is irradiated with a laser beam to cause a first portion where a magnetic coupling of the first, second, and third magnetic films is extinguished and a second portion where the magnetic coupling of the first, second, and third magnetic films is maintained as it is to be formed within a laser beam spot. The signal maintained from the second portion of the first magnetic film is read out.

DETAILED DESCRIPTION OF THE PREFERRED EMBODIMENTS

In the magneto-optical recording medium of the invention, a record or information magnetic domain is formed by a photo or magnetic modulation system, like ordinary magneto-optical recording mediums.

On the other hand, for reproduction, a laser beam is irradiated on the first magnetic film which serves as a reproducing layer, by which magnetization signals of the first magnetic film are read out after conversion into optical signals by the magneto-optical effect (magnetic Kerr effect or Faraday effect). At this time, the magnetic coupling between the first magnetic film serving as the reproducing layer and the second magnetic film used as an intermediate layer is partially interrupted depending on the temperature distribution within a spot diameter of the laser. When an external magnetic field is applied, the magnetic domain at the portion where the magnetic coupling has been interrupted is deformed, i.e. expanded, shrunk or inverted, by application of an external magnetic field. The type of deformation depends on the direction of the external magnetic field.

As a result, the magnetic domain pattern in the spot of the laser beam is read out partially in a masked form, so that even a signal formed at a pitch which is smaller than the spot diameter of the laser beam can be reproduced.

The first magnetic film is mainly composed of GdFeCo wherein the saturation magnetization $M_{s1}$ is not greater than 200 emu/cc when the sublattice of the transition metals is more predominant than that of the rare earth element or when the sublattice of the rare earth element is more predominant than that of the transition metals. The third magnetic film is mainly composed of TbFeCo, in which the saturation magnetization $M_{s3}$ is not greater than 300 emu/cc when the sublattice of the transition metals is more predominant than that of the rare earth element, or not greater than 160 emu/cc when the sublattice of the rare earth element is more predominant than those of the transition metals. By this, a high C/N value is ensured.

Figure 1:
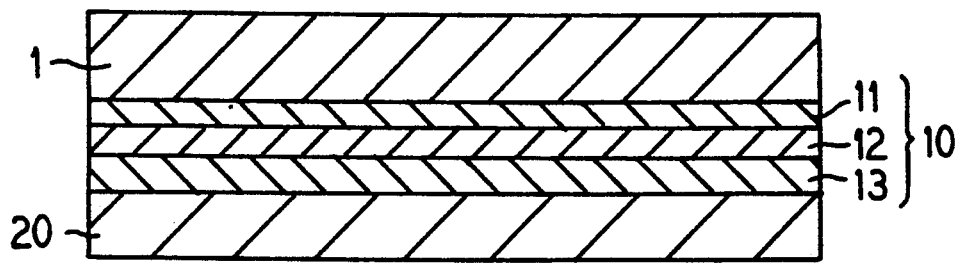
FIG. 1 an enlarged, sectional view of a magneto-optical recording medium according to the invention.

Reference is now made to the accompanying drawings, and particularly to FIG. 1 to illustrate embodiments of the invention.

Initially, the fundamental arrangement of the magneto-optical recording medium of the invention and the principle of reproduction of the medium are described.

FIG. 1 shows a magneto-optical recording medium in accordance with an embodiment of the invention. The medium includes a transparent substrate 1, on which a magnetic film 11 serving as a reproducing layer, a second magnetic film 12 used as an intermediate layer, and a third magnetic film 13 used as a record holding layer are built up, thereby forming a magneto-optical recording layer 10.

The magnetic films 11, 12, 13 are all made of rare earth element-transition metal amorphous alloys. In this embodiment, the first magnetic film 11 is formed of a rare earth element-transition metal amorphous alloy mainly made of GdFeCo. The third magnetic film 13 is formed of a rare earth element-transition metal amorphous alloy mainly made of TbFeCo.

The Curie points and coercive forces of these magnetic films 11, 12, 13 are set as follows. When the Curie point is taken as $T_{c1}$ for the first magnetic film 11, as $T_{c2}$ for the second magnetic film 12, and as $T_{c3}$ for the third magnetic film 13, $60°\,C. \leq T_{c2} \leq 200°\,C.$, $T_{c2} < T_{c1}$, and $T_{c2} < T_{c3}$. Moreover, the coercive force $H_{c1}$ of the first magnetic film 11 is so selected as to be small in the vicinity of the Curie point $T_{c2}$ of the second magnetic film 12. The coercive force $H_{c3}$ of the third magnetic film 13 is selected so as to be larger than a required minimum magnetic field intensity within a temperature range between room temperature $T_{RT}$ and a predetermined temperature $T_{PB}$, which is higher than the Curie point $T_{c2}$ of the second magnetic film 12.

In this embodiment, the surface of the magneto-optical recording layer 10 is covered with a protective film 20. The protective film 20 may be omitted. In addition, a transparent dielectric layer may be provided between the transparent substrate 1 and the magneto-optical recording layer 10 in order to enhance the Kerr angle of rotation.

For the reproduction of the magneto-optical recording medium having such an arrangement as stated above, a recording magnetic domain pattern of the first magnetic film 11 is deformed so as to lower an apparent space frequency of record bits, thereby realizing high density recording.

The principle of the reproduction is as described in Japanese Laid-open Patent Application Nos. 1-143041 and 1-143042, incorporated herein, and the fundamental principle is briefly described below.

Figure 2:
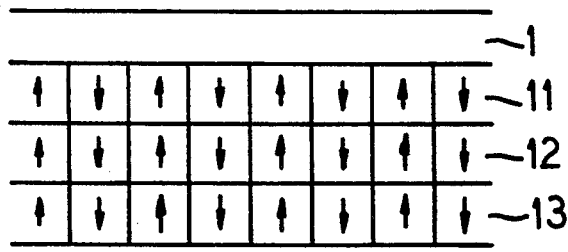
FIG. 2 is a schematic view showing an initially magnetized state of the magneto-optical recording medium.
Figure 3:
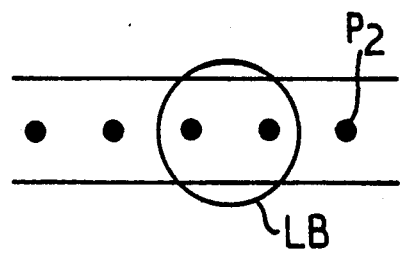
FIG. 3 is a schematic view showing a magnetic pattern in a first magnetic film of the medium in the initially magnetized state.

As shown in FIGS. 2 and 3, given magnetic signals are recorded in the first magnetic film 11, second magnetic film 12, and third magnetic film 13, thereby forming a magnetic domain pattern $P_2$. In FIG. 3, the regions where the direction of magnetization is upward are indicated as solid.

In case of reading out of the signals by means of a laser beam LB when the spot diameter of the laser beam L is larger than a pitch of record bits (magnetic domain pattern), a plurality of record bits exist in the spot. This makes it impossible to read out individual bits by an ordinary reproduction procedure.

In the magneto-optical recording medium of this embodiment, however, the magneto-optical recording layer 10 has a multi-layer structure including the first magnetic film 11, the second magnetic film 12 and the third magnetic film 13. The Curie points and coercive forces of the magnetic films 11, 12, and 13 are set at predetermined values, so that the magnetic domain pattern of the first magnetic film 11 can be deformed, thus making it possible to read out individual record bits even when the spot diameter is larger than pitches of the record bits.

Figure 4:
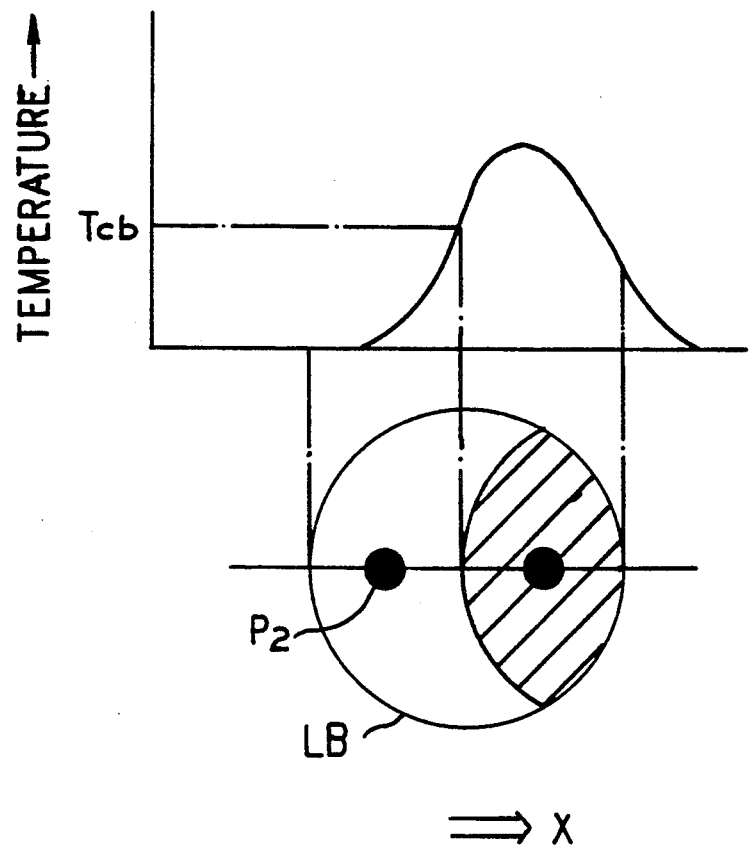
FIG. 4 is a characteristic view showing a temperature profile of a beam spot diameter of a laser beam at the time of reproduction.
Figure 5:
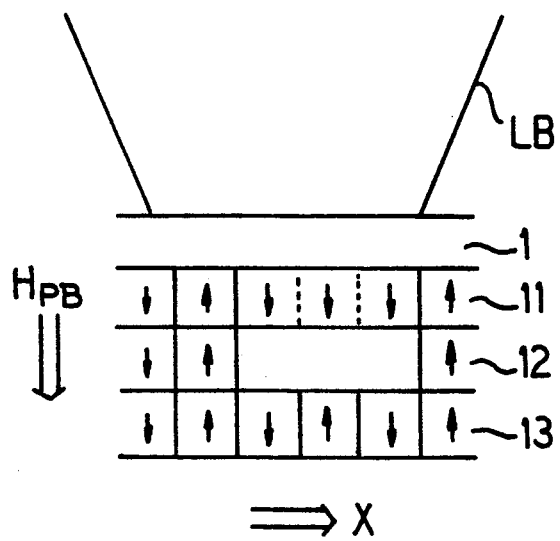
FIG. 5 is a schematic view showing a magnetized state of a magneto-optical recording layer at the time of reproduction.

More particularly, when the laser beam LB is irradiated on the magneto-optical recording layer 10, which has the multilayer structure as stated above, a temperature distribution takes place in the spot. As shown in FIG. 4, the front portion of the laser beam (shaded portion in the figure) as viewed along the direction of running of the medium (i.e. the direction of arrow X in the figure) becomes higher in temperature.

When the temperature $T_H$ of the shaded portion is higher than the Curie point $T_{c2}$ of the second magnetic film 12, the magnetization of the second magnetic film 12 is lost, so that the magnetic coupling (exchange interaction) between the first and third magnetic films 11 and 13 are interrupted.

In this state, when an external magnetic field $H_{PB}$, which is larger than the coercive force $H_{c1}$ of the first magnetic film 11 is applied, the direction of magnetization of the first magnetic film 11 in the shaded portion is inverted and aligned with the direction of the external magnetic field $H_{PB}$ (downward direction in the figure). In portions other than the shaded portion, i.e. in portions whose temperature is lower, the magnetic coupling between the first magnetic film 11 and the third magnetic film 13 is maintained, and the magnetic domain pattern recorded in the third magnetic film 13 is retained as it is in the first magnetic film 11.

Accordingly, the shaded portion within the spot is kept as if it is masked, so that the magnetic domain pattern recorded in this portion apparently disappears, leaving a single magnetic domain pattern to exist in the beam spot. With regard to the space frequency of the record bit as viewed from the reproducing light at the time of reproduction, the absolute value of the optical transmission function becomes greater, thereby improving the reproducing resolution.

In this condition, if the coercive force $H_{c3}$ of the third magnetic film 13 is made greater than the intensity of the external magnetic field $H_{PB}$, the magnetization (magnetic domain pattern) of the third magnetic film 13 does not change by application of the external magnetic field $H_{PB}$.

When the temperature T of the medium is equal to $T = T_{c2}$ after cooling, the exchange force again works. When the following conditions are satisfied, the magnetization pattern of the third magnetic film 13 is transferred to the second magnetic film 12 and the first magnetic film 11, thus returning to the state prior to the reproduction:

$$T \leq T_{c2} - \Delta T$$

$$2M_{s1}H_{c1}h_1 + 2M_{s1}H_{PB}h_1 < \sigma_w \qquad (1)$$

$$2M_{s3}H_{c3}h_3 + 2M_{s3}H_{PB}h_{32} < \sigma_w \qquad (2)$$

In the above inequalities, the thickness of the second magnetic film 12 is taken as negligible as compared with an interfacial magnetic wall width established between the first magnetic film 11 and the third magnetic film 13. $M_{s1}$ represents a saturation magnetization of the first magnetic film 11, $h_1$ is a thickness of the first magnetic film 11, $M_{s3}$ is a saturation magnetization of the third magnetic film 13, $h_3$ is a thickness of the third magnetic film 13, and $\sigma_w$ is an interfacial magnetic wall energy (unit: erg/cm$^2$).

The above inequalities indicate the case where the same sublattice magnetization for the first and third magnetic films 11, 13 are rich or predominant.

The reproduction procedure has been described above using the case where the first magnetic film 11 and the third magnetic film 13 are both rich or predominant in the same sublattice magnetization, and where the signals are read out while inverting the record magnetic domain of the first magnetic film by application of the external magnetic field. If the first magnetic film 11 and the third magnetic film 13 are different from each other with respect to the predominant sublattice magnetization, the inversion, shrinkage or expansion of the magnetic domain pattern is possible by proper selection of the direction of the external magnetic field $H_{PB}$ at the time of reproduction, depending on whether the respective layers are a transition metal sublattice magnetization-rich film or a rare earth element sublattice magnetization-rich film. By this, an apparent space frequency can be suppressed, with the reproducing resolution being improved.

In the magneto-optical recording medium which is subjected to the reproduction procedure as stated above, the Curie points and coercive forces of the first, second, and third magnetic films should satisfy the conditions set forth before. For reproduction at a high C/N value, the following conditions should also be satisfied.

The first magnetic film 11 is a rare earth element-transition metal amorphous alloy film which is mainly composed of GdFeCo. The saturation magnetization $M_{s1}$ of the first magnetic film 11 at room temperature should not be larger than 200 emu/cc when the transition metal sublattice magnetization is rich (hereinafter referred to as TM rich) or not larger than 200 emu/cc when the rare earth element sublattice magnetization is rich (hereinafter referred to as RE rich). The reason for this will be described hereinafter. The first magnetic film 11 may further comprise Cr or the like in order to ensure good reliability and Nd or the like for improvement at short wavelengths.

The Curie point $T_{c2}$ of the second magnetic film should be in the range of from 60° C. to 200° C.

The third magnetic film 13 is a rare earth element-transition metal amorphous alloy film which is mainly made of TbFeCo. The saturation magnetization $M_{s3}$ at room temperature should not be larger than 300 emu/cc when TM is rich and not larger than 160 emu/cc when RE is rich. The third magnetic film 13 may further comprise additive elements, if necessary.

The reason why the optimum ranges of the saturation magnetization of the first and third magnetic films 11 and 13 are different for the TM rich and RE rich cases is now described.

GdFeCo and TbFeCo are called ferromagnetic materials and the sublattice magnetization of the rare earth elements such as Tb, Gd and the like and sublattice magnetization of the transition metals such as Fe, Co and the like are invariably opposite in direction to each other. The difference between the magnetizations of the sublattices is spontaneous magnetization (saturation magnetizations Ms).

For the same value of the saturation magnetization Ms, there are two cases including one wherein the magnetization of the rare earth elements (RE) such as Tb, Gd and the like is rich and other wherein the magnetization of the transition metals (TM) such as Fe, Co and the like is rich. The former case is taken herein as RE rich and the latter case is taken as TM rich.

Figure 6:
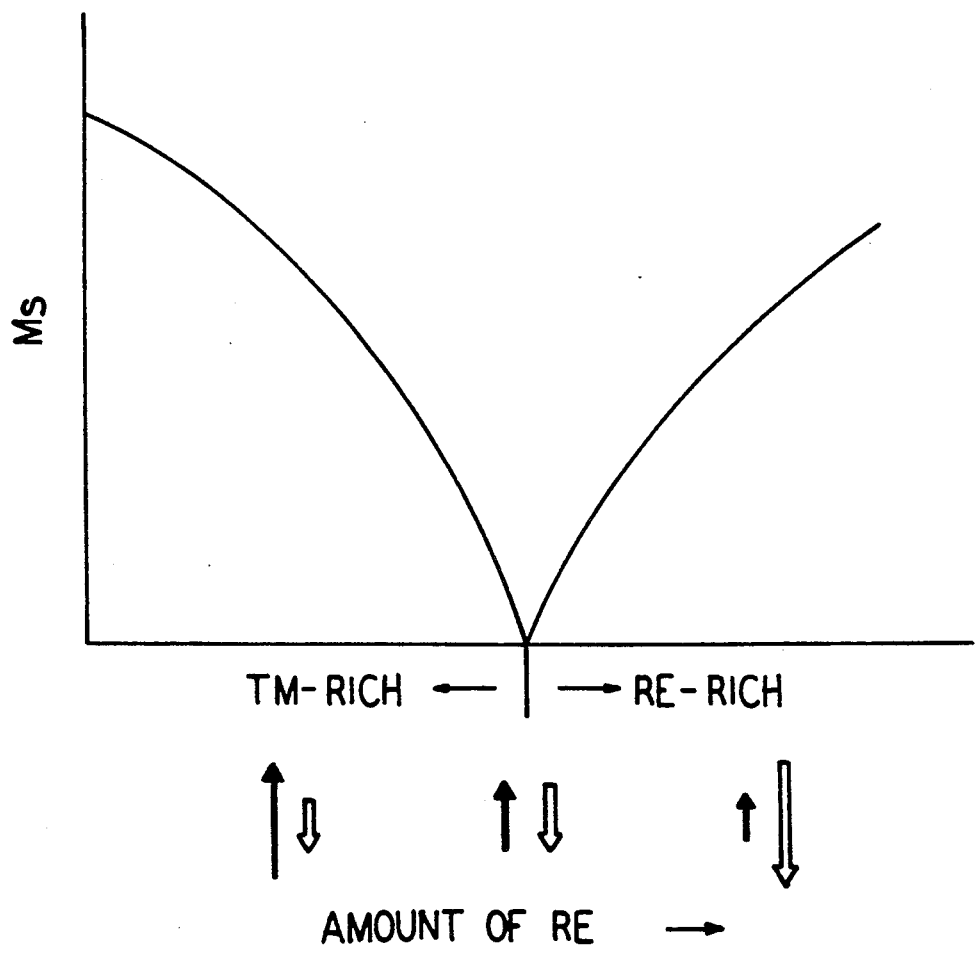
FIG. 6 is a characteristic view illustrating spontaneous magnetization.

This is particularly shown in FIG. 6 wherein the solid arrow indicates the Ms of the TM and white-on-black arrow indicates the Ms of the RE. If rare earth elements are added to transition metals portion by portion, the Ms of the TM is decreased with an increasing amount of the rare earth element, resulting in an increase in the Ms of the RE. The Ms values of TM and RE are equal to each other when a certain amount of RE is added, whereupon the spontaneous magnetization (saturation magnetization Ms) becomes zero. This point is a boundary for the TM rich region where the Ms of the TM is larger than the Ms of the RE (i.e. the left-side region in the figure) and the RE rich region where the Ms of the RE is larger than the Ms of the TM (i.e. the right-side region in the figure).

In the magneto-optical recording medium of the invention, the saturation magnetization $M_{s3}$ of the third magnetic film 13 is important. The value of $M_{s3}$ should not be larger than 300 emu/cc for the TM-rich case and not larger than 160 emu/cc for the Re-rich case.

This is because when the saturation magnetization $M_{s3}$ of the TM-rich region exceeds 300 emu/cc, the magnetization of the third magnetic film 13 used as the record holding layer is inverted by the application of the external magnetic field $H_{PB}$ for the reason that the saturation magnetization $M_{s3}$ is great and the coercive force $H_{C3}$ is small at the reproduction temperature. On the other hand, when $M_{s3}$ exceeds 160 emu/cc, RE-rich and TM-rich regions coexist at a recording temperature, so that the directions of magnetization at the time of reproduction become random.

It will be noted that the saturation magnetization $M_{s3}$ defined above is a value at room temperature, and whether a given region is TM-rich or RE-rich is defined at room temperature. The temperature characteristics (temperature change) of the magnetization of RE and TM, respectively, vary. With certain compositions, the rich state of RE or TM may vary depending on the temperature.

Figure 7:
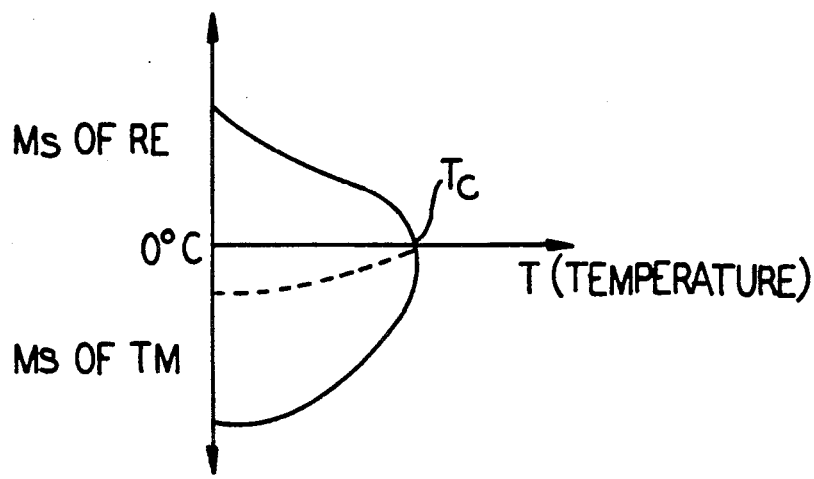
FIG. 7 is a characteristic view showing a temperature change of the respective sublattice magnetizations and spontaneous magnetization when the transition metal magnetization is rich.
Figure 8:
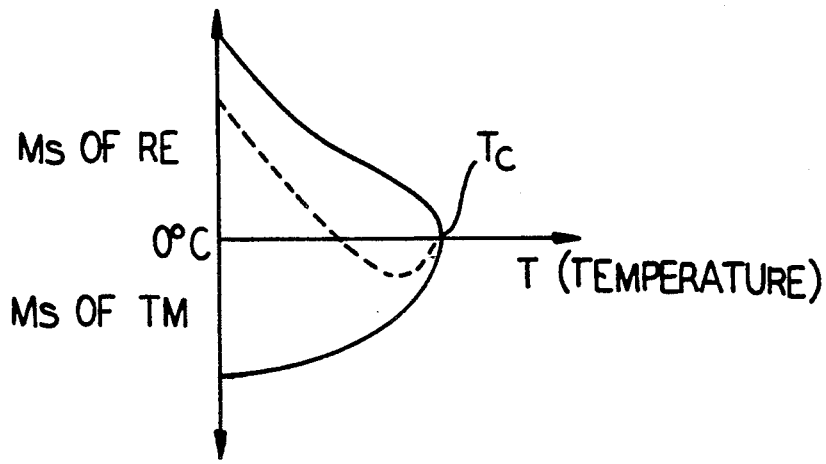
FIG. 8 is a characteristic view showing a temperature change of the respective sublattice magnetizations and spontaneous magnetization when the rare earth element magnetization is rich at low temperatures and the transition metal magnetization is rich at high temperatures.
Figure 9:
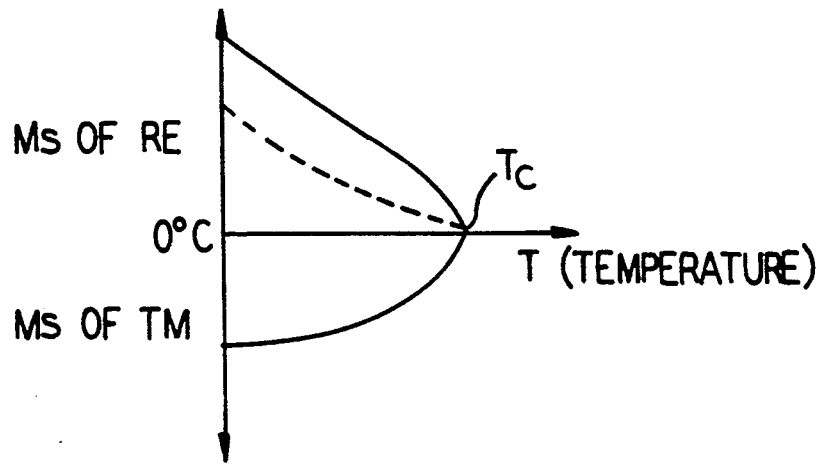
FIG. 9 is a characteristic view showing a temperature change of the respective sublattice magnetizations and spontaneous magnetization when the rare earth element magnetization is rich.

For instance, FIG. 7 shows the respective sublattice magnetizations (indicated by solid line) and the spontaneous magnetization (indicated by broken line) when the magnetization of TM is invariably rich. FIG. 8 shows the respective sublattice magnetizations and the spontaneous magnetization when RE is rich at low temperatures and TM is rich at high temperatures. FIG. 9 shows the respective sublattice magnetizations and the spontaneous magnetization when the sublattice magnetization of RE is invariably rich.

Magneto-optical recording mediums wherein the spontaneous magnetizations of the first magnetic film 11 and the third magnetic film 13 were changed, were fabricated to measure C/N (Carrier-to-Noise) values. The measuring conditions (reproducing conditions) are as follows:

| | |
|---|---|
| Numerical aperture, N.A. of objective | 0.53 |
| Wavelength of reproduction laser beam | 780 nm |
| Reproduction power | 3.0 mW |
| Land width | 1.0 μm |
| Group width | 0.6 μm |
| Linear velocity | 8 m/second |

Figure 10:
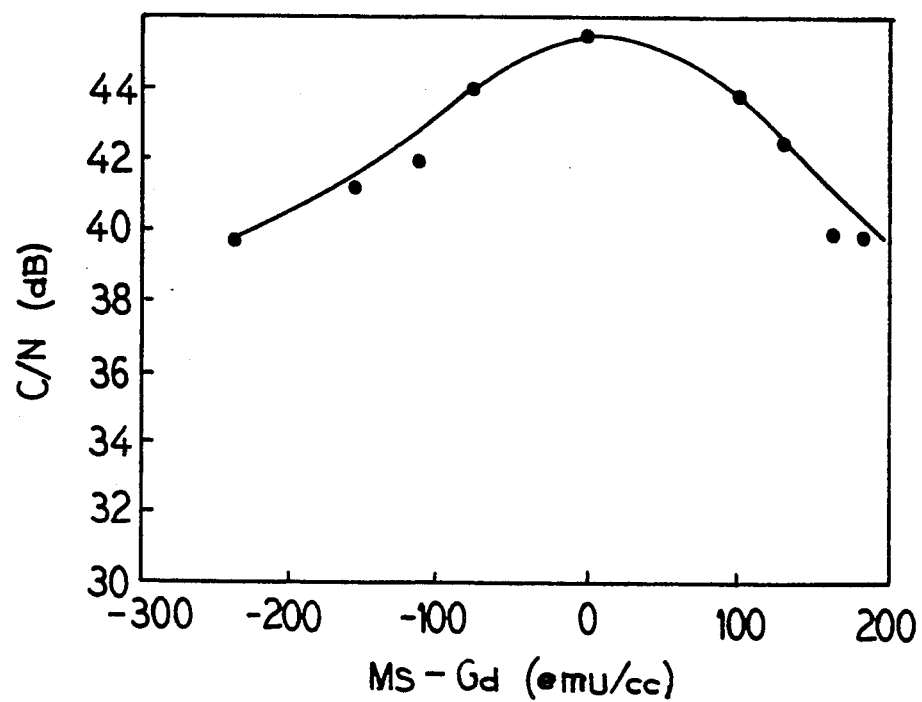
FIG. 10 is a characteristic view showing the relationship between the spontaneous magnetization of the first magnetic film and C/N.

FIG. 10 shows a change of C/N relative to the spontaneous magnetization of the first magnetic film 11 serving as a reproduction layer. In FIG. 10, the spontaneous magnetization is represented by the magnetization of Gd (Ms−Gd), so that the plus side is RE rich and the minus side is TM rich.

As will be apparent from FIG. 10, the first magnetic film 11 has an optimum range of the magnetization, i.e. a high C/N value is obtained in the range of 200 emu/cc in the TM-rich region to 200 emu/cc in the RE-rich region.

Figure 11:
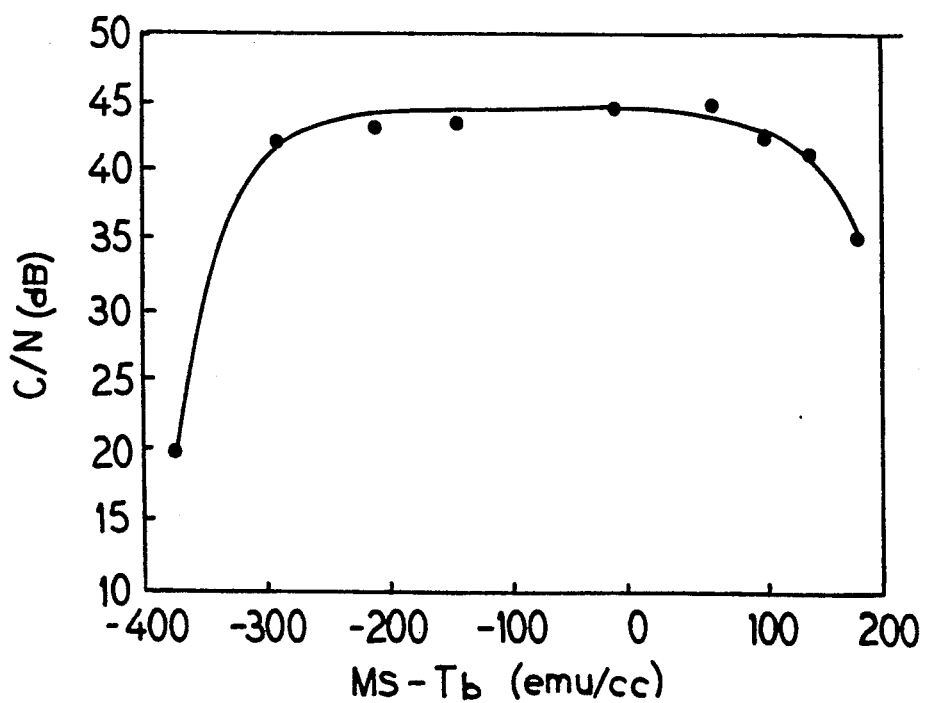
FIG. 11 is a characteristic view showing the relationship between the spontaneous magnetization of the third magnetic film and C/N.

FIG. 11 shows a change of C/N relative to the spontaneous magnetization of the third magnetic film 13 serving as a record-holding layer. In FIG. 10, the spontaneous magnetization is represented by the magnetization of Tb (Ms−tB), so that the plus side is RE rich and the minus side is TM rich.

With regard to the third magnetic film 13, the C/N value is abruptly lowered in a TM-rich region exceeding 300 emu/cc (in a region less than −300 emu/cc in the figure) or in a RE-rich region exceeding 160 emu/cc (in a region exceeding +160 emu/cc).

As will become apparent from the foregoing description, the magneto-optical recording medium has an exchange-interacted, multi-layered film as a recording magnetic layer consisting of a reproduction layer, an intermediate layer and a record-holding layer in such a way that Curie points and coercive forces of the respective layers are set to satisfy certain conditions. Accordingly, an information bit (magnetic domain) can be partially enlarged, reduced or distinguished at the time of reproduction, so that signals with a pitch or interval which is greater than a diffraction limit of light can be reproduced.

Since the spontaneous magnetizations of the first magnetic layer used as a reproduction layer and the third magnetic film serving as a record holding layer ar defined within certain ranges, respectively, reproduction with a high C/N value is possible.

Although various minor changes and modifications might be proposed by those skilled in the art, it will be understood that we wish to include within the claims of the patent warranted hereon all such changes and modifications as reasonably come within our contribution to the art.

We claim as our invention:

1. A magneto-optical recording medium, comprising:
   a magneto-optical recording layer on a transparent substrate, said recording layer comprising a first magnetic film, a second magnetic film, and a third magnetic film which are magnetically coupled to one another at room temperature $T_{RT}$;
   Currie points $T_{c1}$, $T_{c2}$ and $T_{c3}$ of the first, second and third magnetic films respectively having relationships of 60° C.$\leq T_{c2} \leq$200° C., $T_{c2} < T_{c1}$ and $T_{c2} < T_{c3}$;
   a coercive force $H_{c1}$ of the first magnetic film being relatively small in a vicinity of the Curie point $T_{c2}$ of the second magnetic film and a coercive force $H_{c3}$ of the third magnetic film being relatively larger than a required minimum magnetic field intensity employed for reproducing from the medium within a temperature range between said room temperature $T_{RT}$ and a predetermined temperature $T_{PB}$ which is higher than the Curie point $T_{c2}$ of the second magnetic film;
   the first magnetic film being mainly composed of a rare earth element and transition metals GdFeCo and a saturation magnetization $M_{s1}$ of the first magnetic film being not greater than 200 emu/cc when a sublattice of the transition metals is more predominant than a sublattice of the rare earth element or when a sublattice of the rare earth element is more predominant than a sublattice of the transition metals; and
   the third magnetic film being mainly composed of a rare earth element and transition metals TbFeCo and a saturation magnetization $M_{s3}$ of the third magnetic film being not greater than 300 emu/cc when a sublattice of the transition metals is more predominant than a sublattice of the rare earth element or not greater than 160 emu/cc when a sublattice of the rare earth element is more predominant than a sublattice of the transition metals.

2. A magneto-optical recording medium according to claim 1 further comprising a transparent dielectric film provided between the substrate and the magneto-optical recording layer, and a protective layer formed on the magneto-optical layer.

3. A method for reproducing a signal of a recorded magnetic domain from a magneto-optical recording medium, comprising the steps of:
   providing a first magnetic film, a second magnetic film and a third magnetic film which are magnetically coupled to one another room temperature $T_{RT}$; and wherein Curie points $T_{c1}$, $T_{c2}$ and $T_{c3}$ of the first, second and third magnetic films respectively have relationships of $T_{c2} > T_{RT}$, $T_{c2} < T_{c1}$ and $T_{c2} < T_{c3}$;
   selecting a coercive force $H_{c1}$ of the first magnetic film to be small in a vicinity of the Curie point $T_{c2}$ of the second magnetic film and selecting a coercive force $H_{c3}$ of the third magnetic film to be larger than a required minimum intensity of an external reproducing magnetic field within a temperature range between said room temperature $T_{RT}$ and a predetermined temperature $T_{PB}$ which is higher than the Curie point $T_{c2}$ of the second magnetic film;

providing the first magnetic film as being mainly composed of a rare earth element and transition metals GdFeCo and providing a saturation magnetization $M_{s1}$ of the first magnetic film to be not greater than 200 emu/cc when a sublattice of the transition metals is more predominant than a sublattice of the rare earth element or when a sublattice of the rare earth element is more predominant than a sublattice of the transition metals;

mainly composing the third magnetic film of a rare earth element and transition metals TbFeCo and providing a saturation magnetization $M_{s3}$ of the third magnetic film to be not greater than 300 emu/cc when a sublattice of the transition metals is more predominant than a sublattice of the rare earth element, or not greater than 160 emu/cc when a sublattice of the rare earth element is more predominant than a sublattice of the transition metals;

upon reproduction of a signal from the magneto-optical recording medium, heating the medium to the predetermined temperature $T_{PB}$ to interrupt a magnetic coupling between the first and third magnetic films with application of the external reproducing magnetic field in order to demagnetize magnetic fields or stray magnetic fields from the recording medium, and providing the external reproducing magnetic field with an intensity sufficient to change a domain size in the first magnetic film.

4. A method according to claim 3 wherein the signal is obtained by detecting signal change upon the domain size.

5. A method for reproducing a signal of a recorded magnetic domain from a magneto-optical recording medium comprising the steps of:

providing a first magnetic film, a second magnetic film, and a third magnetic film which are magnetically coupled to one another at room temperature $T_{RT}$, and wherein Curie points $T_{c1}$, $T_{c2}$ and $T_{c3}$ of the first, second and third magnetic films respectively have the relationships of $T_{c2} > T_{RT}$, $T_{c2} < T_{c1}$ and $T_{c2} < T_{c3}$;

selecting a coercive force $H_{c1}$ of the first magnetic film to be small in a vicinity of the Curie point $T_{c2}$ of the second magnetic film and selecting a coercive force $H_{c3}$ of the third magnetic film to be larger than a required minimum intensity of an external reproducing magnetic field within a temperature range between said room temperature $T_{RT}$ and a predetermined temperature $T_{PB}$ which is higher than the Curie point $T_{c2}$ of the second magnetic film;

providing the first magnetic film as being mainly composed of a rare earth element and transition metals GdFeCo;

providing a saturation magnetization $M_{s1}$ of the first magnetic film to be not greater than 200 emu/cc when a sublattice of the transition metals is more predominant than a sublattice of the rare earth element or when a sublattice of the rare earth element is more predominant than a sublattice of the transition metals;

mainly composing the third magnetic film of a rare earth element and transition metals TbFeCo and providing a saturation magnetization $M_{s3}$ of the third magnetic film to be not greater than 300 emu/cc when a sublattice of the transition metals is more predominant than a sublattice of the rare earth element, or not greater than 160 emu/cc when a sublattice of the rare earth element is more predominant than a sublattice of the transition metals;

upon reproduction of a signal from the magneto-optical recording medium, heating the medium to the predetermined temperature $T_{PB}$ to interrupt a magnetic coupling between the first and third magnetic films with application of the external reproducing magnetic field in order to demagnetize magnetic fields or stray magnetic fields from the recording medium, and providing the external reproducing magnetic field to the first magnetic field with an intensity sufficient to cause shrinking of a size of a recorded magnetic domain.

6. A method according to claim 5 wherein the signal is obtained by detecting signal change upon the shrinking of the domain size.

7. A method for reproducing a signal of a recorded magnetic domain from a magneto-optical recording medium comprising the steps of:

providing a first magnetic film, a second magnetic film, and a third magnetic film which are magnetically coupled to one another at room temperature $T_{RT}$, and wherein Curie points $T_{c1}$, $T_{c2}$ and $T_{c3}$ of the first, second and third magnetic films respectively have relationships of $T_{c2} > T_{RT}$, $T_{c1}$ and $T_{c2} < T_{c3}$;

selecting a coercive force $H_{c1}$ of the first magnetic film to be small in a vicinity of the Curie point $T_{c2}$ of the second magnetic film and selecting a coercive force $H_{c3}$ of the third magnetic film to be larger than a required minimum intensity of an external reproducing magnetic field within a temperature range between said room temperature $T_{RT}$ and a predetermined temperature $T_{PB}$ which is higher than the Curie point $T_{c2}$ of the second magnetic film;

providing the first magnetic film as being mainly composed of a rare earth element and transition metals GdFeCo;

providing a saturation magnetization $M_{s1}$ of the first magnetic film to be not greater than 200 emu/cc when a sublattice of the transition metals is more predominant than a sublattice of the rare earth element or when a sublattice of the rare earth element is more predominant than a sublattice of the transition metals;

mainly composing the third magnetic film of rare earth and transition metals TbFeCo and providing a saturation magnetization $M_{s3}$ of the third magnetic film to be not greater than 300 emu/cc when a sublattice of the transition metals is more predominant than a sublattice of the rare earth element, or not greater than 160 emu/cc when a sublattice of the rare earth element is more predominant than a sublattice of the transition metals;

upon reproduction of a signal from the magneto-optical recording medium, heating the medium to the predetermined temperature $T_{PB}$ to interrupt a magnetic coupling between the first and third magnetic films with application of the external reproducing magnetic field in order to demagnetize magnetic fields or stray magnetic fields from the recording medium, and providing the external magnetic field to the first magnetic film with an intensity sufficient to expand a size of a recorded magnetic domain.

8. A method according to claim 7 wherein the signal is obtained by detecting signal change upon the expanding of the domain size.

9. A method for reproducing information signals from a magneto-optical recording medium, comprising the steps of:
   providing a first magnetic film, a second magnetic film, and a third magnetic film magnetically coupled to each other at room temperature $T_{RT}$, and wherein Curie points $T_{c1}$, $T_{c2}$ and $T_{c3}$ of the first, second and third magnetic films respectively have relationships of $60°\ C. \leq T_{c2} \leq 200°\ C.$, $T_{c2} \leq T_{c1}$ and $T_{c2} < T_{c3}$;
   mainly composing the first magnetic film of a rare earth element and transition metals GdFeCo, and providing a saturation magnetization $M_{s1}$ of the first magnetic film to be not greater than 200 emu/cc when a sublattice of the transition metals is more predominant than a sublattice of the rare earth element or when a sublattice of the rare earth element is more predominant than a sublattice of the transition metals;
   mainly composing the third magnetic film of a rare earth element and transition metals TbFeCo and providing a saturation magnetization $M_{s3}$ of the third magnetic film to be not greater than 300 emu/cc when a sublattice of the transition metals is more predominant than a sublattice of the rare earth element, or not greater than 160 emu/cc when a sublattice of the rare earth element is more predominant than a sublattice of the transition metals; and
   irradiating the medium with a laser beam to cause within a laser beam spot on the medium a first portion where magnetic coupling of the first, second and third magnetic films is extinguished and a second portion where magnetic coupling of the first, second and third magnetic films is maintained, and reading out the signals from the second portion of the first magnetic film.

10. A magneto-optical recording medium, comprising:
   first magnetic film, second magnetic film, and third magnetic film which are magnetically coupled to one another;
   Curie points $T_{c1}$, $T_{c2}$, and $T_{c3}$ of the first, second, and third magnetic fields having the relationships $T_{c2} < T_{c1}$ and $T_{c2} < T_{c3}$;
   the first magnetic film being composed of a rare earth element and transition metals and having a saturation magnetization $M_{s1}$ not greater than 200 emu/cc; and
   the third magnetic film being composed of a rare earth element and transition metals and a saturation magnetization $M_{s3}$ being not greater than 300 emu/cc where a sublattice of the transition metals is more predominant than a sublattice of the rare earth element or not greater than 160 emu/cc when a sublattice of the rare earth element is more predominant than a sublattice of the transition metals.

* * * * *